US 3,787,546
Patented Jan. 22, 1974

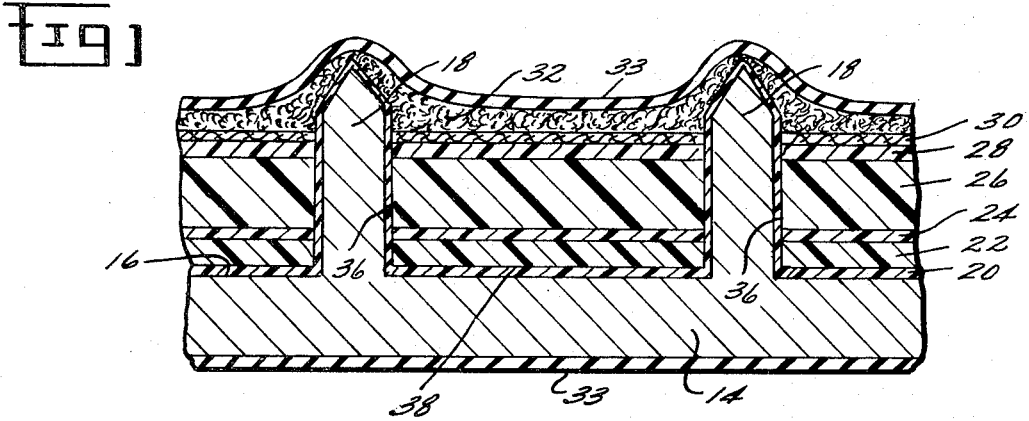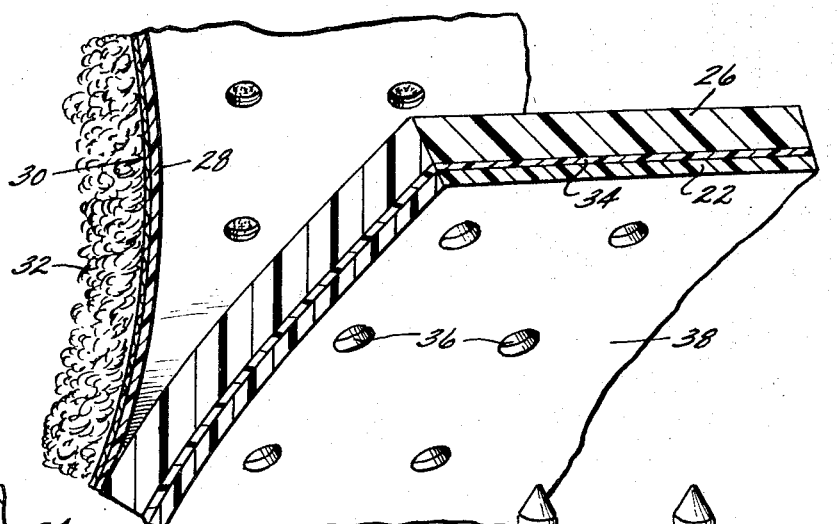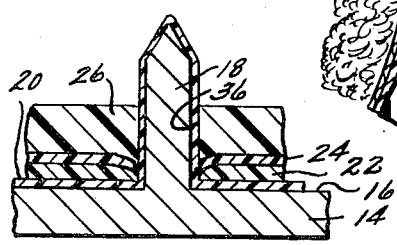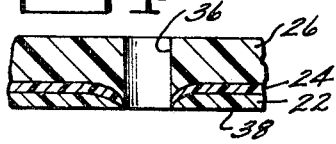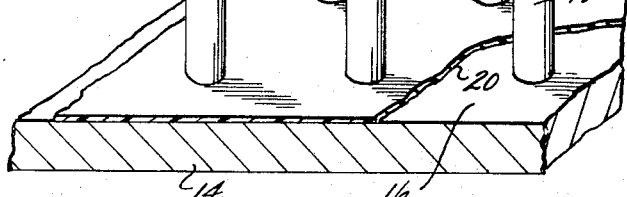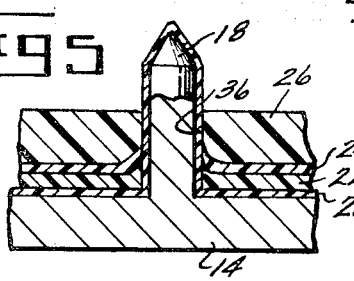
INVENTORS.
RICHARD D. PRATT
KENNETH W. EWING
ATTORNEY—

3,787,546
METHOD FOR MAKING A PERFORATED
PLASTIC ARTICLE
Richard D. Pratt and Kenneth W. Ewing, Cincinnati, Ohio, assignors to General Electric Company
Filed Dec. 21, 1970, Ser. No. 100,218
Int. Cl. B29h 3/06
U.S. Cl. 264—156
3 Claims

ABSTRACT OF THE DISCLOSURE

A perforated plastic article such as a perforated reinforced laminated plastic sheet is made on a studded mold by applying pressure to the plastic to press the sheet toward the mold through a pressure transmitting material, for example, hair felt. One form of the method includes making a perforated reinforced plastic composite article having an improved erosion resistant elastomer surface through use of a compatible tack coat such as of the erosion resistant elastomer between a reinforced plastic sheet and the erosion resistant elastomer.

BACKGROUND OF THE INVENTION

Development of improved reinforced plastic members has resulted in their application as jet engine components under conditions within the strength and temperature limitations of the plastic material. One type of application includes the use of a perforated sheet as one member surface mounted in the air passage of such engines. For example, such perforations can be used in connection with sound suppression means.

Because of the rapid and large volume flow of air through such jet engine passages, air-borne particles have eroded the surface of such members. In addition, delamination around the periphery of the perforations has been observed as a result of the constant impact and abrasion of such particles.

SUMMARY OF THE INVENTION

It is a principal object of the present invention to provide an improved method for making a perforated plastic article.

Another object is to provide an improved method for making a reinforced perforated plastic member having bonded to its surface an erosion resistant elastomer coating compatible with the reinforced plastic.

These and other objects and advantages will be more fully understood from the following detailed description, including the drawing, all of which is meant to be representative of rather than limiting on the scope of the present invention.

Briefly, the method of the present invention, in one form of the manufacture of a perforated plastic article on a studded mold, comprises first pressing a partially cured plastic sheet over the studs so that the studs project through the sheet. A pressure transmitting material such as a substantially solid, loosely held fibrous or felt-like material, for example hair felt, is then applied to the plastic sheet and around the studs. The mold thus prepared is placed in a substantially non-porous collapsible enclosure, such as a plastic bag, from which the air is substantially evacuated thus pressing the bag against the pressure transmitting material. Such material, in turn, applies pressure to the plastic sheet, toward the mold and around the studs. In this condition, the enclosed mold is heated to cure the plastic sheet.

In another form of the present invention, an erosion resistant reinforced plastic composite article is provided with a base sheet of a glass reinforced plastic, for example of the epoxy, modified epoxy or polyaromatic type, preferably polyimide, to one surface of which is bonded an erosion resistant elastomer coating, for example, a thermosetting polyurethane elastomer. This form of the method using a polyurethane elastomer preferably uses a polytetrafluoroethylene mold release agent first applied to the mold prior to application of the erosion resistant coating. Then such coating is prepared in place, such as by brushing or spraying, to provide an air drying or catalyzed portion.

After application and at least partial curing of such coating, a thin tack coat of the erosion resistant elastomer material is applied over the coating. Then the reinforced plastic material, such as glass fiber reinforced epoxy resin, is applied to and pressed on the tack coat while it is still tacky. Processing is concluded as described above. This combination of laminate, after curing of the entire composite, results in a member easily removed from the mold surfaces, including the studs. It provides a perforated plastic article having an erosion resistant coating securely bonded to a surface.

BRIEF DESCRIPTION OF THE DRAWING

FIG. 1 is a fragmentary, diagrammatic, sectional view of a studded mold during practice of the method of the present invention to provide an erosion resistant perforated article;

FIG. 2 is an expanded, isometric, fragmentary, sectional view of such article as made in FIG. 1 and separated from the mold;

FIG. 3 is a fragmentary, diagrammatic, sectional view of an article still mounted on a mold after processing and to which was applied an erosion resistant surface in the form of a preformed film;

FIG. 4 is the article of FIG. 3 which is believed to result from such processing;

FIG. 5 is a fragmentary, diagrammatic, sectional view of an article still mounted on a mold after processing according to the present invention in that there was applied an erosion resistant surface in the form of a coating first applied to the mold prior to application of other components of the article to be manufactured; and FIG. 6 is the article formed in FIG. 5.

DESCRIPTION OF THE PREFERRED EMBODIMENTS

Application of composite plastic members in the air passages of jet engines requires in the member, in addition to the normal strength properties at the temperatures of intended application, the additional property of resistance to erosion of air-borne particles. When a member surface located in the air stream is perforated, as would be the case with sound suppression panel material, delaminations at the periphery of the perforations occur due to the impact of air-borne particles.

The composite article formed in accordance with the method of the present invention has been found to have a barrier surface stable from the viewpoint of resistance to erosion of air-borne particles as well as from the standpoint of compatibility and resistance to delamination from the base reinforced plastic structure to which it was applied. Stability exists during preparation of the article as well as during its use; it was resistant to change during curing and stable at the curing temperature.

As will be described in more detail particularly in connection with FIGS. 5 and 6, the application of an erosion resistant coating material in the form of a preformed film in the at least partially cured condition is not desirable in providing a barrier surface for the prevention of delaminations at the periphery of the perforations. However, application of such material in its substantially uncured, fluid form has been found to provide improved resistance to such erosion and delamination.

One example of the use of the method of the present invention is the formation of a perforated, reinforced plastic article including an erosion resistant coating as the barrier surface bonded to one face. As shown in FIG. 1, such an article was manufactured on a mold 14 including a mold surface 16 from which projected a plurality of tip pointed studs 18 used to form perforations in the composite article. According to the method of the present invention, there was first applied to the surface 16 a mold release material 20, such as of the tetrafluoroethylene type commonly used in the art of manufacturing plastic composite articles. It should be recognized, however, that any compatible mold release system which provides a continuous release surface at mold surface 16 can be used.

After application of the mold release system, a coating of polyurethane elastomer 22 was applied to the prepared mold. The type of polyurethane elastomer used in this example is marketed as Adiprene L167 and was catalyzed by an agent sometimes called "Moca," which is understood to be a 4,4' methylene bis (2 chloroaniline). The proportions of the mixture, by weight, were about 100 parts of polyurethane elastomer to about 20 parts of catalyst.

In order to provide the periphery of the perforations with improved resistance to erosion and delamination, the erosion resistant coating, in this case polyurethane elastomer, was applied in the catalyzed, substantially uncured fluid state, such as by brushing or spraying the catalyzed elastomer over the prepared mold. The elastomer in this fluid condition tends to wet and collect at the base and lower portion of the studs projecting from the mold surface and to creep along the surface of the stud away from the mold surface. This condition is discussed in more detail in connection with FIGS. 5 and 6.

After application of the elastomer, for example to a thickness of about 0.005", it was cured in place. Such curing can be accomplished at room temperature or, as in this example, more rapidly by heating at a temperature up to about 210° F. After the cured polyurethane coating was in position on the mold, a thin tack coat of the same elastomer material, in this example polyurethane, was applied to cover such coating. In this example, the tack coat material was applied to a thickness of about 0.001" by spraying. It is generally required in an amount sufficient to wet the surface to which it is applied. After application of the tack coat material, it was cured to the point at which it was tacky by allowing it to stand at room temperature for about 1–1½ hours. In this way, there was provided over the erosion resistant coating that which is referred to herein as a tack coat. In this case, it was a polyurethane tack coat 24 in FIG. 1 over polyurethane film 22.

The reinforced plastic base sheet portion of the article formed in this example of the present invention was then applied over the polyurethane tack coat. The total thickness of the base sheet portion was about 0.03". Such a material, usually referred to as "prepreg," is generally a resin impregnated cloth, such as of glass, in the partially cured condition sufficient to enable it to be handled as a sheet. Generally, the total thickness of about 0.03" is produced through the application of a series of thinner prepreg sheets or laminae, for example, of about 0.01" each. In this example, the cloth was an 8 harness satin weave glass cloth impregnated with epoxy resin and partially cured so that it could be handled as a sheet. However, it should be understood that a variety of reinforced plastic materials including epoxy, modified epoxy and polyaromatic (such as polyimide) types can be applied so long as they are compatible with and can be bonded to the erosion resistant elastomer coating through the tack coat. Such a laminated reinforced plastic material was then pressed onto the mold over pointed studs 18 and in contact with tack coat 24.

While holding the laminated reinforced plastic material, shown as 26 in FIG. 1, in intimate contact with tack coat 24, the composite was cured at about 300° F. for about 1 hour to provide the perforated article of the present invention. Pressing of such reinforced plastic material in intimate contact with the tack coat was accomplished according to the present invention by applying over the reinforced plastic sheet and around the studs a pressure transmitting material in an amount sufficient to substantially cover the studs and the plastic sheet. In this example, prior to application of such pressure transmitting material, a fluoroethylene polymer release film 28 in FIG. 1 was placed over the glass reinforced epoxy resin sheet. Then an absorbent bleeder cloth 30, in this example a glass cloth, was placed over the release film. The pressure transmitting material used in this example was hair felt 32 placed over the bleeder cloth. It should be understood that other materials, such as sand, vermiculite, etc. can be used as well.

The entire mold and article components on the mold thus prepared were enclosed in a substantially non-porous collapsible enclosure, such as 33 in FIG. 1, in this example a nylon bag. Then air was removed from the enclosure in a manner well known in the art. In this way, pressure from the atmosphere was transmitted through the hair felt 32 uniformly across the plastic reinforced sheet 26 pressing it against the laminae beneath it, toward mold surface 16 and around the base projection 18. Then heat was applied at 300° F. for about 1 hour to cure the various plastic components. During curing, tack coat 24 blends both with the erosion resistant coating 22 and the resin of the reinforced plastic 26 and cures to provide an intermediate bonding portion, shown as 34 in FIG. 2, between reinforced plastic 26 and the erosion resistant elastomer 22. It should be understood that although the tack coat described herein is referred to as being of the same material as the erosion resistant elastomer, other tack coat material can be used provided it will blend and cure, in the manner described, both with the elastomer of the erosion resistant coating and the resin of the plastic base sheet.

After curing, the mold and its article were removed from the nylon bag 33. Hair felt 32, bleeder cloth 30 and release film 28 were stripped from the mold as shown diagrammatically in FIG. 2. Then the perforated composite article comprising a base portion 26 of a reinforced plastic and an erosion resistant portion 22 of a polyurethane coating, having a barrier surface 38 and bonded to the base portion through an intermediate bonding portion 34 was removed from the mold over the pointed studs 18 by stripping it from mold release material 20.

As was mentioned before, there is a significant difference in the erosion resistance at the periphery of perforations adjacent barrier surface 38 between the article formed with the erosion resistant elastomer applied as a film in the at least partially cured condition, and the article formed with such elastomer applied in the substantially uncured fluid form. The presentation in FIG. 3 shows diagrammatically the shape and position of intermediate bonding portion 34 and its interfaces between the base reinforced plastic 26 and between the erosion resistant coating 22. In respect to the mold and its stud 18, this configuration is believed to be the result of the tendency of a precured film, in this case film 22, to draw away from stud 18 during heating. A fragmentary, sectional view of the article which is believed to result from the use of such a film is shown in FIG. 4. Because of the relatively small amount of erosion resistant material around the periphery of perforation 36 adjacent barrier surface 38, erosion resistance and delamination resistance in that area is not substantially improved.

By way of contrast in the practice of the method of the present invention, FIG. 5 shows the effect of applying elastomer coating 22 in its substantially uncured, fluid state. Because such a fluid has a tendency to wet and collect at the base of stud 18 and creep along the stud outer surface, the intermediate bonding portion 34 and erosion resistant coating 22 are created along the surface of stud 18 as shown in FIG. 5. The article which results from the practice of this method, as shown in FIG. 6, provides a perforation 36 of improved resistance to erosion and delamination adjacent barrier surface 38. A significantly greater amount of erosion resistant material is disposed within that portion of the periphery of perforation 36 adjacent barrier surface 38 which, as in jet engine applications, can be designed to be exposed to rapidly flowing high volumes of air which can carry erosive particles.

What is claimed is:

1. In a method for making a perforated plastic article with an erosion resistant barrier surface, the steps of:
   providing a mold having a mold surface and spaced apart studs projecting from the mold surface;
   applying an erosion resistant elastomer coating to the mold surface in the substantially uncured fluid state;
   at least partially curing the elastomer coating;
   applying to the elastomer coating a relatively thin tack coat of a resin which, during curing, will blend both with the elastomer and with a subsequently applied plastic sheet;
   partially curing the tack coat to a tacky condition;
   placing a curable plastic sheet over the studs so that the studs project through the sheet;
   placing over the plastic sheet and around the studs a loosely held, felt-like pressure transmitting material;
   applying pressure to the plastic sheet through the pressure transmitting material to press the sheet toward the mold surface;
   curing the plastic sheet while under the applied pressure; and then removing the pressure transmitting material.

2. The method of claim 1 in which:
   a mold release agent is first applied to the mold surface and the studs;
   the plastic sheet is glass cloth reinforced;
   the resin of the plastic sheet is selected from the group consisting of epoxy, modified epoxy and polyaromatic resins; and
   the erosion resistant elastomer is polyurethane.

3. The method of claim 1 in which the tack coat material is polyurethane.

References Cited

UNITED STATES PATENTS

| | | | |
|---|---|---|---|
| 3,704,194 | 11/1972 | Harrier | 249—183 X |
| 3,666,600 | 5/1972 | Yoshino | 264—90 X |
| 3,607,600 | 9/1971 | Schreter | 264—257 |

FOREIGN PATENTS

| | | | |
|---|---|---|---|
| 799,072 | 7/1958 | Great Britain | 264—156 |

ROBERT F. WHITE, Primary Examiner

T. P. PAVELKO, Assistant Examiner

U.S. Cl. X.R.

156—242, 252, 285; 264—90, 255, 257, 316, 324, Dig. 70, Dig. 78